United States Patent [19]

Nagasawa

[11] Patent Number: 4,928,979
[45] Date of Patent: May 29, 1990

[54] SEALING APPARATUS

[75] Inventor: Shinji Nagasawa, Fukushima, Japan

[73] Assignee: NOK Corporation, Tokyo, Japan

[21] Appl. No.: 238,562

[22] Filed: Aug. 30, 1988

[30] Foreign Application Priority Data

May 30, 1988 [JP] Japan .................. 63-71460[U]

[51] Int. Cl.⁵ .................. F16J 15/32; F16J 15/34; F16J 15/40
[52] U.S. Cl. .................. 277/38; 277/68; 277/95; 277/133; 277/134; 277/152
[58] Field of Search .................. 277/95, 67, 68, 25, 277/133, 38, 39, 152, 134; 384/478, 479, 482, 472

[56] References Cited

U.S. PATENT DOCUMENTS

| | | |
|---|---|---|
| 2,292,920 | 8/1942 | Barrows .................. 277/133 |
| 2,541,645 | 2/1951 | Fasoli .................. 277/133 X |
| 2,592,645 | 2/1952 | Kayser .................. 277/133 X |
| 3,311,430 | 3/1967 | Christensen et al. .................. 277/95 X |
| 3,431,036 | 3/1969 | Musser .................. 384/472 |
| 4,557,612 | 12/1985 | Neal .................. 277/68 X |
| 4,596,394 | 6/1984 | Schmitt .................. 277/38 |
| 4,721,312 | 1/1988 | Hornberger .................. 277/95 X |

Primary Examiner—Allan N. Shoap
Attorney, Agent, or Firm—Kenyon & Kenyon

[57] ABSTRACT

A sealing apparatus has a main body which is mounted on a housing and is provided with a sealing lip, and a rotary body mounted on a rotary shaft of a member with which the apparatus is combined. The rotary body extends in the radial direction of the rotary shaft and has one side surface which is in sliding contact with the sealing lip. The apparatus also has at least one bent portion formed by bending a notch formed in an outer edge portion of a side surface of the rotary body.

5 Claims, 3 Drawing Sheets 4,928,979

SEALING APPARATUS

BACKGROUND OF THE INVENTION

The present invention relates to a sealing apparatus and, more particularly, to a sealing apparatus for rotatable component parts of a vehicle.

Known sealing apparatuses of this type include a sealing apparatus as shown in FIG. 5A. The sealing apparatus 100 has the following construction: A rotary shaft 101 is rotatable in the direction of arrow, i.e. in the counter-clockwise direction, as viewed on the left side of the figure. A slinger 102 is fitted around the rotary shaft 101 and has a side surface 103 extending in the radial direction. The sealing apparatus 100 has a housing 104 on which a sealing apparatus main body 105 is mounted. A sealing lip 106 extends from the sealing apparatus main body 105 and is in sliding contact with a portion of the side surface 103 of the slinger 102, so as to seal oil which serves as a sealed fluid and which is on the B (right) side of the apparatus, as viewed in FIG. 5A. It is known in general that a sealing apparatus, such as the apparatus 100, in other words an end seal, does not possess the so-called pumping action, i.e., the action of sucking in air on the A (left) side of the apparatus, as viewed in FIG. 5A, to the sealed fluid (oil) side, to thereby prevent the oil from leaking. Therefore, it is general to provide a thread 107 on a portion of the side surface 103 of the slinger 102 so that air on the side A is forcibly sucked in by the apparatus (see FIG. 5B).

Japanese Utility Model Publication No. 55580/1982 discloses another conventional sealing apparatus, as shown in FIG. 6, in which a thread is also provided on a side surface of a slinger. According to this disclosure, a rotary shaft 111 is partitioned by a partitioning member 112 into the oil side 113 and the atmospheric air side 114. A rotary member 115 is secured to the rotary shaft 111. A seal ring 116 is secured to the partitioning member 112 by means of a fixing member 117, and the tip 161 of the seal ring 116 is in contact with a side surface 151 which is at the tip of the rotary member 115 and is closer to the partitioning member 112. The fixing member 117 opposes a hook-shaped portion 152 of the rotary member 115 with a small gap 171 between, and it is provided with a groove 172 which is adjacent to the seal ring 116 and is recessed radially inward of the tip 161.

With the conventional sealing apparatus having the above-described construction, oil in the oil side 113 is sealed from the atmospheric air side 114 by virtue of the annular contact between the tip 161 of the seal ring 116 and the side surface 151 of the rotary member 115, the side surface being closer to the partitioning member 112.

The above-described prior art, however, encounters the following disadvantages. With the conventional sealing apparatus shown in FIGS. 5A and 5B, the apparatus has to be manufactured by processes including the process of forming the thread. In addition, during the rotation of the rotary shaft 101, because part of the sealed oil may flow toward the sealing portion through a gap 108 between the slinger 102 and the housing 104, the level of sealing performance cannot be very high. During stoppage, oil may leak through the thread 107. Further, the sealing portion, which may be exposed to a large amount of oil, exhibits a low durability.

With the conventional sealing apparatus shown in FIG. 6, when the rotary shaft 111 remains stationary, oil may leak through the thread provided on the side surface of the slinger. In order to prevent this problem, an oil trap, such as the groove 172, has to be formed, thus causing an increase in the number of processes required for manufacturing the apparatus and an increase in production costs.

SUMMARY OF THE INVENTION

In order to solve the problems encountered by the prior art, it is an object of the present invention to provide a sealing apparatus which is capable of preventing the sealing portion from being supplied with a large amount of oil and is also capable of preventing any oil leakage when the rotary shaft remains stationary, the sealing apparatus thus being capable of providing an enhanced durability of the sealing portion and exhibiting an enhanced level of sealing performance.

In order to achieve the above-stated and other objects of the present invention, a sealing apparatus in accordance with the present invention comprises: a housing; a sealing apparatus main body mounted on the housing and provided with a sealing lip; a rotary body mounted on a rotary shaft of a member with which the apparatus is combined, the rotary body extending in a radial direction of the rotary shaft and having one side surface which is in sliding contact with the sealing lip; and a bent portion formed by bending a notch that is formed in an outer edge portion of a side surface of the rotary body.

In one preferred embodiment of the present invention, a plurality of bent portions are provided on a side surface of the rotary body on radially outer peripheral portions thereof on a sealed fluid side of the rotary body.

Further, a suitable structure such as a stepped portion may be formed in an inner wall of the housing so as to make the gap between the inner wall of the housing and an outer edge of the side of the rotary body small, thereby ensuring that the effect of the present invention is achieved to a greater extent.

Thus, with the sealing apparatus in accordance with the present invention, at least one projection member which serves as a projection is provided on the outer peripheral portion of a side surface of the rotary body for the purpose of shunting part of the sealed fluid radially outward. By virtue of the provision of the bent portion, part of the sealed fluid is shunted by centrifugal force during the rotation of the rotary body. This arrangement makes it possible to prevent part of of the sealed fluid from being supplied to the sealing portion, i.e. the portion of contact at which the sealing lip is in sliding contact with the rotary body, in a large amount, thereby enabling an improvement in the durability of the sealing portion and a great improvement of the sealing performance.

DESCRIPTION OF THE PREFERRED EMBODIMENTS

The present invention will be described hereunder with respect to the illustrated embodiments thereof.

Figure 1B:
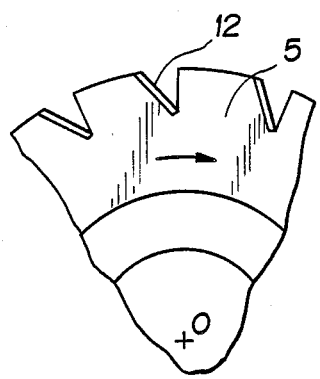
FIG. 1B is a fragmentary plan view of a rotary body of the sealing apparatus shown in FIG. 1A, which is taken in the direction Z shown in FIG. 1A.
Figure 1A:
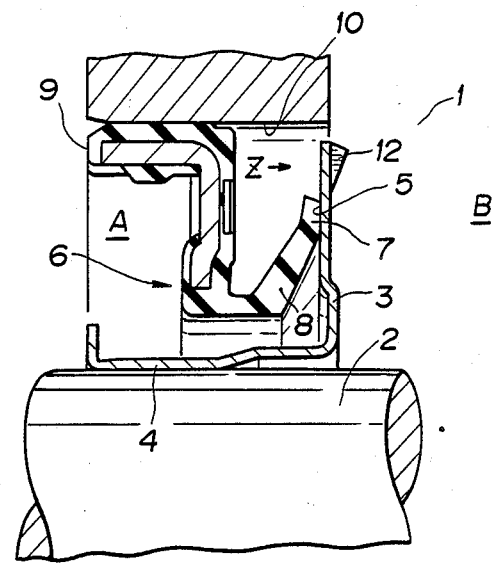
FIG. 1A is a fragmentary sectional view of a sealing apparatus in accordance with a first embodiment of the present invention, sectioned through a plane including the axis of the rotary shaft associated.
Figure 2:
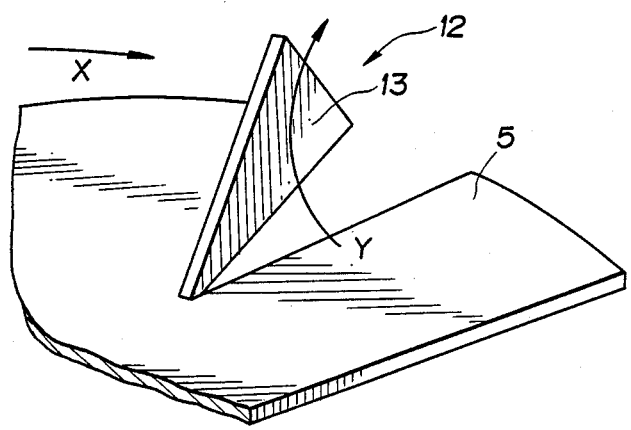
FIG. 2 is a perspective view of a bent portion provided on a slinger serving as the rotary body.

FIGS. 1A, 1B and 2 illustrate a sealing apparatus 1 in accordance with a first embodiment of the present invention. The sealing apparatus 1 has a slinger 3 which is fixed to a rotary shaft 2 and serves as a rotary body. The slinger 3, serving as a rotary body, has its cylindrical portion 4 fixed to the rotary shaft 2, while its tip portion is bent in the radial direction to provide a side surface. The tip of this bent portion opposes a housing 10 of the apparatus 1 with a gap between.

The apparatus 1 further has a sealing apparatus main body 6 which in turn has a lip tip 7 that acts to prevent any leakage of the fluid. The lip tip 7 is connected to a sealing lip portion 8 of the main body 6, and the portion 8 acts to reduce the level of influence on the lip tip 7 by vibration of the associated machine and reduce variation in pressure so that the lip tip 7 is kept in its stable contact condition. The sealing apparatus main body 6 also has a fitting portion 9 which is provided radially outward of the sealing lip portion 8 and forms an outer peripheral portion of the main body 6. The fitting portion 9 acts to fix in place the sealing apparatus main body 6 within the housing 10 as well as to prevent any leakage through the gap between the surfaces of contact between the inner surface of the housing 10 and the outer peripheral surface of the main body 6. The lip tip 7 has a wedge-shaped section and presses adequately against the mating portion of the inner side surface 5 of the slinger 3, so as to seal the fluid on the side B as viewed in FIG. 1A. The width of contact of the lip tip 7 with the inner side surface 5 portion is relatively small, and the force by which the lip tip 7 presses against the side surface 5 portion as well as the material forming the sealing lip portion 8 determines the ability of sealing the fluid. The sealing lip portion 8 is mainly formed of rubber and its configuration determines the pressing force of the lip tip 7 generated by the circumferential extension and bending of the lip.

Although not shown, the sealing apparatus main body 6 may further has a dust lip on the atmospheric air side of the sealing lip portion 8 (i.e., the side A as viewed in FIG. 1A). The dust lip is a portion of the main body 6 which acts to prevent any penetration of dust from the exterior. The dust lip is an auxiliary lip which is smaller than the sealing lip portion 8, and its tip is in contact with the radially outer peripheral surface of the cylindrical portion 4 of the slinger 3.

Further, according to this embodiment of the present invention, bent portions 12 are provided on the inner side surface 5 of the slinger 3 at outer peripheral portions of the surface 5 which are radially outward of the portion of contact at which the lip tip 7 is in sliding contact with the side surface 5. Each of the bent portions 12 is formed by notching a circumferential outer peripheral portion of the slinger 3 and bending the notched portion in such a manner that it projects in the axial direction of the slinger 3. Accordingly, each bent portion 12 forms a projection which is substantially triangular when viewed in a profile of the slinger 3, and it has a lateral face 13 directed in the circumferential direction. Thus, the bent portions 12 are provided around the entire circumference of the slinger 3 at suitable intervals. The sealing apparatus 1 having the bent portions 12 of the above-described construction operates in the following manner.

With the rotation of the rotary shaft 2, the slinger 3 mounted on the rotary shaft 2 rotates. The bent portions 12 provided on the slinger 3 rotate as the slinger 3 rotates. If it is assumed that the slinger 3 rotates in the direction X indicated by the arrow shown in FIG. 2, part of the fluid, e.g. oil, in the vicinity of each bent portion 12 is subjected to the pump-blade-like action of the circumferentially-directed lateral face 13 of each projection 12 so as to be shunted toward the outer periphery of the slinger 3. The directions in which part of the oil is shunted are indicated by arrows Y in FIG. 2. In this way, that part of oil is kept from reaching the portion of contact between the lip tip 7 of the sealing lip portion 8 and the inner side surface 5 portion, whereby that oil is prevented from reaching the above-said portion of contact in a large amount.

Figure 3:
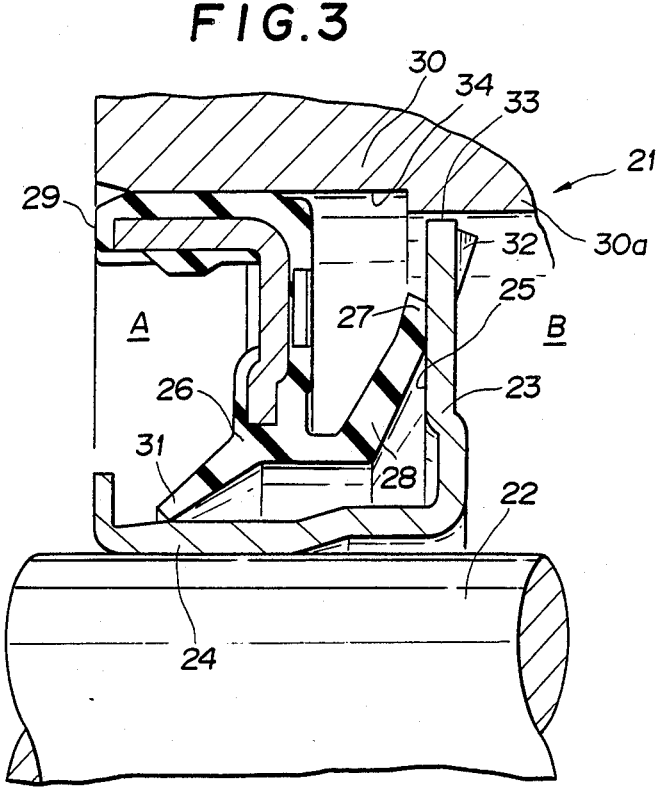
FIG. 3 is a fragmentary sectional view corresponding to FIG. 1A, which illustrates a sealing apparatus in accordance with a second embodiment of the present invention.

FIG. 3 illustrates a sealing apparatus in accordance with a second embodiment of the present invention. A sealing apparatus 21 in accordance with this embodiment has a slinger 23 which is fixed to a rotary shaft 22 and serves as a rotary body. The slinger 23, serving as a rotary body, has its cylindrical portion 24 fixed to the rotary shaft 22 while its tip portion is bent in the radial direction to provide a side surface 25.

A main body 26 of the sealing apparatus 21 has a lip tip 27 which acts to prevent any leakage of the fluid (e.g., oil). The lip tip 27 is connected to a sealing lip portion 28 of the main body 26. The sealing apparatus main body 26 also has a fitting portion 29 which is provided radially outward of the sealing lip portion 28 and forms an outer peripheral portion of the main body 26. The fitting portion 29 acts to fix in place the sealing apparatus main body 26 in a cavity 34 of a housing 30 as well as to prevent any leakage through the gap between the surfaces of contact between the inner surface of the housing cavity 34 and the outer peripheral surface of the main body 26. The lip tip 27 has a wedge-shaped section and presses adequately against the mating portion of the inner side surface 25 of the slinger 23 to seal the fluid on the side B as viewed in FIG. 3. Further, a dust lip 31 is provided on the atmospheric air side of the sealing lip portion 28 (i.e., the side A as viewed in FIG. 3), and it acts as a portion of the main body 26 to prevent any penetration of dust from the exterior.

According to this embodiment, a plurality of bent portions 32 are provided at radially outer peripheral portions of the side surface of the rotary body 23 that is on the sealed fluid side B of the rotary body 23.

Further, the housing 30 is provided with an inner stepped portion 30a, so as to make the gap 33 between the housing 30 and the outer edge of the rotary body 23 small.

With the sealing apparatus 21 having the above-described construction, when the rotary body 23 rotates, the bent portions 32 shunt part of the oil and, in addition, the narrow gap 33 prevents that oil from entering into the cavity 34 in a large amount. In consequence, the oil is kept from flowing to the vicinity of the lip tip 27 of the sealing lip portion 28, thereby maintaining the sealing performance.

Figure 4:
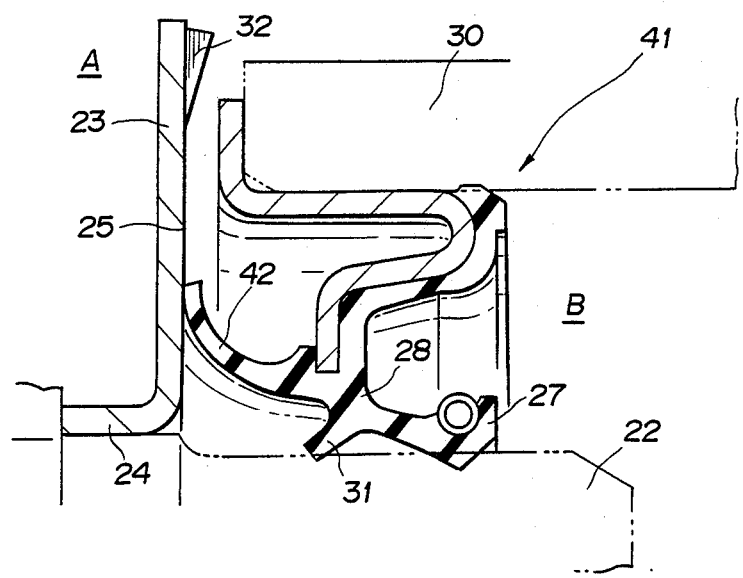
FIG. 4 is a fragmentary sectional view corresponding to FIG. 1A, which illustrates a sealing apparatus in accordance with a third embodiment of the present invention.
Figure 5A:
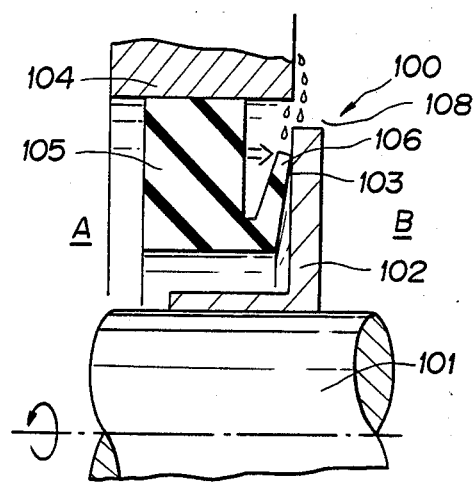
FIG. 5A is a fragmentary sectional view corresponding to FIG. 1A, which illustrates a conventional sealing apparatus.
Figure 5B:
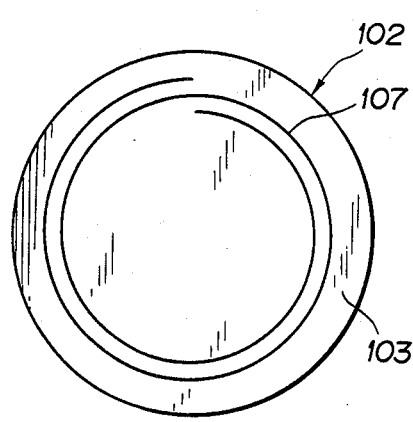
FIG. 5B is a plan view of a slinger of the conventional apparatus shown in FIG. 5A.
Figure 6:
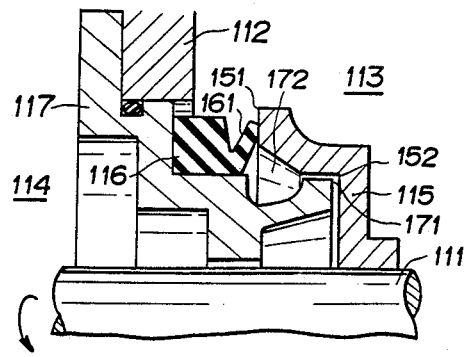
FIG. 6 is a fragmentary sectional view corresponding to FIG. 1A, which illustrates another conventional sealing apparatus.

FIG. 4 illustrates a third embodiment of the present invention. A sealing apparatus 41 in accordance with this embodiment is applicable to a location which is exposed to muddy water or the like. The sealing apparatus 41 has a side lip 42 which is one kind of a sealing lip. The side lip 42 is in sliding contact with the side surface 25 of a rotary body 23 of the apparatus 41 that is on an oil side (the side B as viewed in FIG. 4). A plurality of bent portions 32 are provided on radially outer peripheral portions and are arranged in the circumferential direction of the rotary body 23. With the above-described construction of the sealing apparatus 41, when the rotary body 23 rotates, the bent portions 32 act to shunt any muddy water coming from the atmospheric air side (the side A as viewed in FIG. 4), thereby preventing the muddy water from flowing to the side lip 42.

Thus, according to the present invention, the bent portions 12 or 32 act to shunt part of a fluid. Therefore, no fluid is permitted to reach the sealing portion, thereby preventing leakage of oil or penetration of muddy water.

As described above, with the sealing apparatus of the present invention, bent portions are provided on radially outer peripheral portions of a side surface of the rotary body for shunting part of a fluid radially outward. Since the bent portions act to shunt part of the fluid radially outward, no large amount of oil flows to the sealing portion, thereby enabling an improvement in the sealing performance.

It is to be understood that the present invention is not limited to the foregoing embodiments, and various modifications which can be made with respect to, e.g., the configuration of the bent portions, are also included in the scope of the present invention.

I claim:

1. A sealing apparatus comprising:
   a housing;
   a sealing apparatus main body mounted on said housing and provided with a sealing lip;
   a rotary body mounted on a rotary shaft of a member with which said apparatus is combined, said rotary body extending in a radial direction of said rotary shaft and having a side surface which is in sliding contact with said sealing lip; and
   a bent portion formed by bending a notch portion formed in an outer edge portion of a side surface of said rotary body at a portion circumferentially outward of said contacting of said sealing lip with said side surface of the rotary body.

2. A sealing apparatus according to claim 1, wherein said bent portion is formed and bent in such a manner as to project on a sealed oil side of said rotary body.

3. A sealing apparatus according to claim 1, comprising a plurality of bent portions which are provided on a side surface of said rotary body on radially outer peripheral portions thereof at predetermined intervals.

4. A sealing apparatus according to claim 1, wherein the gap between an outer edge of the side surface of said rotary body and an inner wall of said housing is made small.

5. A sealing apparatus according to claim 4 wherein said housing inner wall has a portion opposingly adjacent said outer edge of said side surface of said rotary body, said portion of said inner wall being stepped radially inward toward said shaft whereby the gap between said portion of said inner wall and said outer edge of said side surface is small.

* * * * *